United States Patent
Terasawa

(10) Patent No.: US 11,066,078 B2
(45) Date of Patent: Jul. 20, 2021

(54) VEHICLE POSITION ATTITUDE CALCULATION APPARATUS AND VEHICLE POSITION ATTITUDE CALCULATION PROGRAM

(71) Applicant: DENSO CORPORATION, Kariya (JP)

(72) Inventor: Hideki Terasawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 16/307,961

(22) PCT Filed: Apr. 4, 2017

(86) PCT No.: PCT/JP2017/014097
§ 371 (c)(1),
(2) Date: Dec. 7, 2018

(87) PCT Pub. No.: WO2017/212762
PCT Pub. Date: Dec. 14, 2017

(65) Prior Publication Data
US 2019/0185016 A1 Jun. 20, 2019

(30) Foreign Application Priority Data
Jun. 10, 2016 (JP) .............................. JP2016-116477

(51) Int. Cl.
*B60W 40/114* (2012.01)
*B60W 40/072* (2012.01)
(Continued)

(52) U.S. Cl.
CPC ........... *B60W 40/114* (2013.01); *B60R 21/00* (2013.01); *B60W 30/10* (2013.01);
(Continued)

(58) Field of Classification Search
CPC .. B60W 40/114; B60W 40/10; B60W 40/072; B60W 2520/14; B60W 30/10;
(Continued)

(56) References Cited

U.S. PATENT DOCUMENTS

2011/0320163 A1* 12/2011 Markkula ........... B60W 40/072
702/150
2012/0327233 A1   12/2012 Imai et al.
(Continued)

FOREIGN PATENT DOCUMENTS

JP         5625094 B2    11/2014
JP         2015-5132   *  1/2015

OTHER PUBLICATIONS

Machine Translation JP 2015-5132 (Jan. 2015).*

*Primary Examiner* — Anne Marie Antonucci
(74) *Attorney, Agent, or Firm* — Harness, Dickey & Pierce, P.L.C.

(57) ABSTRACT

A vehicle position attitude calculation apparatus includes: a road structure recognition portion that acquires information, calculate a road structure shape, calculate a relative road structure lateral position, and calculate a relative road structure yaw angle; a storage portion that stores the road structure shape, the relative road structure lateral position, and the relative road structure yaw angle, an autonomous navigation portion that calculates a relative trajectory; a virtual road structure recognition portion that calculates a virtual relative road structure lateral position and a virtual relative road structure yaw angle; and an output switching portion that outputs the relative road structure lateral position and the relative road structure yaw angle, while the road structure recognition portion can recognize the road structure, and output the virtual relative road structure lateral position and the virtual relative road structure yaw angle, (Continued)

while the road structure recognition portion cannot recognize the road structure.

9 Claims, 4 Drawing Sheets

(51) Int. Cl.
  *G06K 9/00* (2006.01)
  *G01C 21/32* (2006.01)
  *G08G 1/16* (2006.01)
  *B60R 21/00* (2006.01)
  *B60W 40/10* (2012.01)
  *B60W 30/10* (2006.01)

(52) U.S. Cl.
  CPC .......... *B60W 40/072* (2013.01); *B60W 40/10* (2013.01); *G01C 21/32* (2013.01); *G06K 9/00798* (2013.01); *G08G 1/16* (2013.01); *B60W 2520/14* (2013.01)

(58) Field of Classification Search
  CPC .......... G08G 1/16; B60R 21/00; G01C 21/32; G06K 9/00798
  See application file for complete search history.

(56) References Cited

U.S. PATENT DOCUMENTS

| 2015/0375755 A1 | 12/2015 | Imai et al. |
| 2016/0052544 A1* | 2/2016 | Ueda .................. B62D 15/025 701/25 |

* cited by examiner

VEHICLE POSITION ATTITUDE CALCULATION APPARATUS AND VEHICLE POSITION ATTITUDE CALCULATION PROGRAM

CROSS-REFERENCE TO RELATED APPLICATIONS

This application is a U.S. National Phase Application under 35 U.S.C. 371 of International Application No. PCT/JP2017/014097 filed on Apr. 4, 2017. This application is based on and claims the benefit of priority from Japanese Patent Application No. 2016-116477 filed on Jun. 10, 2016. The entire disclosures of all of the above applications are incorporated herein by reference.

TECHNICAL FIELD

The present disclosure relates to a vehicle position attitude calculation apparatus and a vehicle position attitude calculation program.

BACKGROUND ART

A vehicle position attitude calculation apparatus calculates a position attitude of a vehicle. This kind of the vehicle position attitude calculation apparatus recognizes a lane marking (for example, white lane or the like) on a road surface based on a forward video image of the vehicle photographed by an image device, a movement distance of the vehicle detected by a vehicle speed detection portion, and an azimuth variation amount of the vehicle detected by an inertial sensor, for example. The vehicle position attitude calculation apparatus calculates a relative lane marking lateral position indicating a vehicle lateral position to the lane marking and calculates a relative lane marking yaw angle indicating a vehicle yaw angle while calculating a lane marking shape indicating a shape of the lane marking.

This kind of the vehicle position attitude calculation apparatus can calculate a position attitude of the vehicle while recognizing the lane marking. This kind of the vehicle position attitude calculation apparatus cannot recognize the lane marking by abrasion on the lane marking on the road surface, a bad weather, a night time, a backlighting, on a shielding of a preceding vehicle, a vehicle pitching, or the like. Considering this situation, a configuration that addresses a situation while the lane marking is unrecognizable, is provided (for example, Patent Literature 1). The configuration includes a non-detection counter counting the number of times of unrecognizing the lane marking. The configuration performs averaging by changing a weighting of the marking yaw angle with respect to the non-detection number.

PRIOR ART LITERATURE

Patent Literature

Patent Literature 1: JP 5625094 B2

SUMMARY OF INVENTION

According to the configuration described above, error occurs at a non-detection time at which a lane marking is unrecognizable. The error increases when a non-detection section continues.

It is considered of a configuration referring a road structure database based on a road structure database measured in advance, while the lane marking is unrecognizable. The configuration calculates a position attitude of the vehicle even while the lane marking is unrecognizable. According to the configuration described above, for example, a position or a length of the lane marking may change due to redrawing of paint, for example. The reliability is not ensured. The configuration is kept in just a reference, and is not practical.

It is an object of the present disclosure to provide a vehicle position attitude calculation apparatus and a vehicle position attitude calculation program enabling to appropriately calculate a position attitude of the vehicle and output even while the road structure such as, for example, lane marking is unrecognizable.

According to one aspect of the present disclosure, a vehicle position attitude calculation apparatus includes: a road structure recognition portion that is configured to acquire information including a road structure of a vehicle forward to recognize the road structure, calculate a road structure shape showing a shape of a road, calculate a relative road structure lateral position showing a vehicle lateral position to the road structure, and calculate a relative road structure yaw angle showing a vehicle yaw angle to the road structure; a storage portion that is configured to store the road structure shape, the relative road structure lateral position, and the relative road structure yaw angle, which are calculated by the road structure recognition portion, an autonomous navigation portion that is configured to calculate a relative trajectory of the vehicle; a virtual road structure recognition portion that is configured to calculate a virtual relative road structure lateral position and a virtual relative road structure yaw angle, based on the road structure shape, the relative road structure lateral position, the relative road structure yaw angle, which are stored in the storage portion, and the relative trajectory of the vehicle, which is calculated by the autonomous navigation portion; and an output switching portion that is configured to, output as a device output, the relative road structure lateral position and the relative road structure yaw angle, which are calculated by the road structure recognition portion, to a subsequent stage, while the road structure recognition portion is able to recognize the road structure, and output as the device output, the virtual relative road structure lateral position and the virtual relative road structure yaw angle, which are calculated by the virtual road structure recognition portion, to the subsequent stage, while the road structure recognition portion is unable to recognize the road structure.

The storage portion stores the road structure shape, the road structure lateral position and the relative road structure yaw angle while the road structure such as, for example, the lane marking is recognizable. While the road structure is unrecognizable, the virtual relative road structure lateral position and the virtual relative road structure yaw angle are calculated based on the road structure shape, the relative road structure lateral position, the relative road structure yaw angle, and the relative trajectory of the vehicle, stored in the storage portion. The calculated virtual relative road structure lateral position and the calculated virtual relative road structure yaw angle are outputted as the device output, to the subsequent stage. Thereby, it may be possible to appropriately calculate and output the position attitude of the vehicle even while the road structure such as, for example, the lane marking is unrecognizable. Then, the road structure is recognized by acquiring the information including the road structure of a vehicle forward, instead of referring to the road structure database measured in advance. Therefore, it may be possible to ensure the reliability and appropriately apply to the driving assistance application requiring the reliability. Preparation of a map is unnecessary corresponding to the road structure database since the road structure database is not referred. The data communication to acquire the road structure database is unnecessary. It may be possible to easily perform a function safe address.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Figure 1:
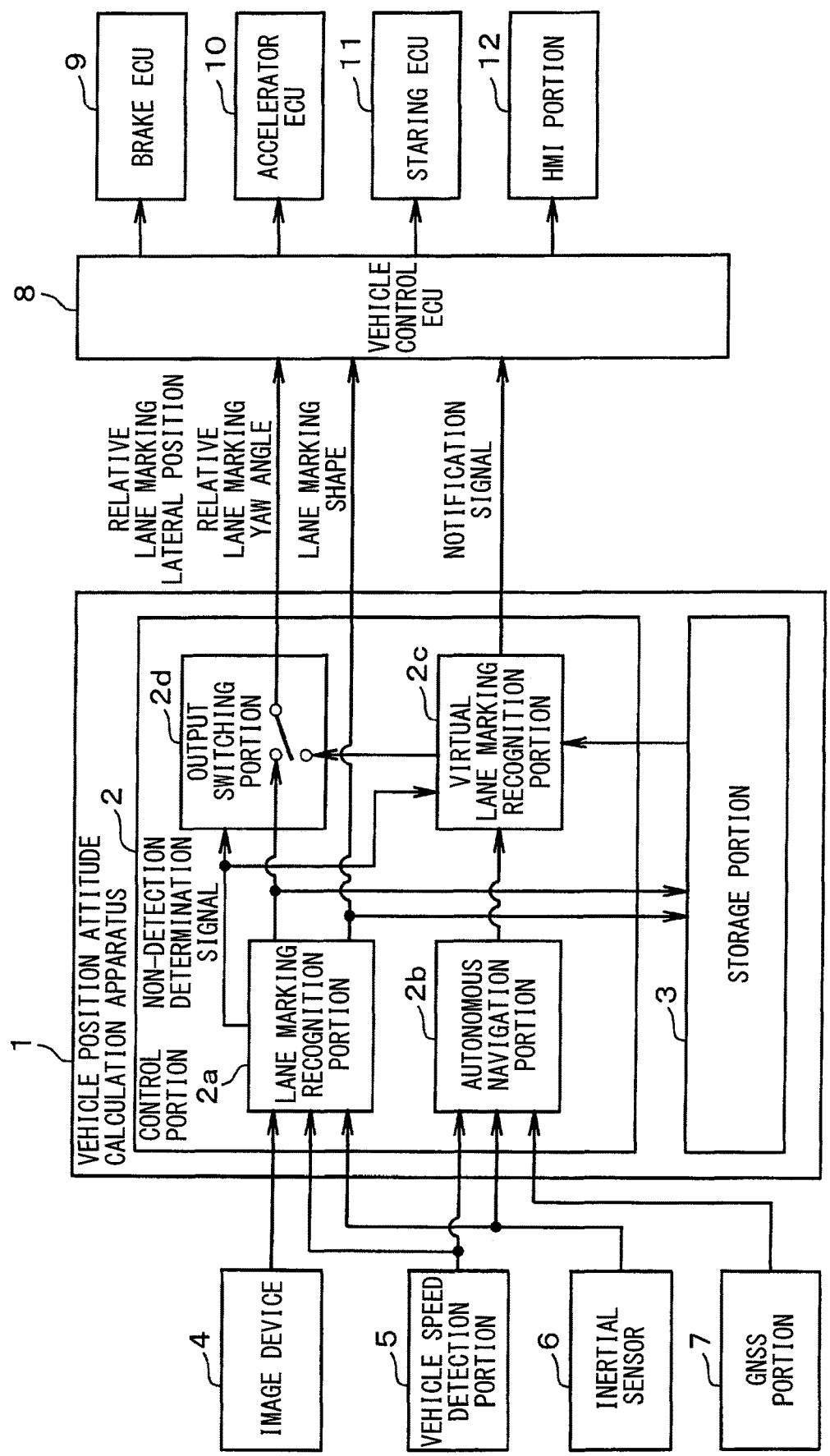
FIG. 1 is a block diagram showing a function according to one embodiment.

One embodiment applied to a vehicle position attitude calculation apparatus is described with reference to the drawings. The vehicle position attitude calculation apparatus recognizes a lane marking on a road surface as a road structure and calculates a position attitude of the vehicle. A vehicle position attitude calculation apparatus 1 includes a control portion 2 and a storage portion 3. The control portion 2 is configured from a microcomputer including a CPU (Central Processing Unit), a ROM (Read Only Memory), a RAM (Random Access Memory), and an I/O (Input/Output). The control portion 2 executes a process corresponding to a computer program by executing the computer program stored in a non-transitory tangible storage medium. Thereby, the control portion 2 controls an overall operation of the vehicle position attitude calculation apparatus 1. The control portion 2 includes a lane marking recognition portion 2a (corresponding to a road structure recognition portion), an autonomous navigation portion 2b and a virtual lane marking recognition portion 2c (corresponding to a virtual road structure recognition portion), and an output switching portion 2d. Each of these portions 2a-2d is configured from a vehicle position attitude calculation program executed by the control portion 2, and is provided by software.

An image device 4 is installed in, for example, a rear face of a rearview mirror in a vehicle compartment (that is, a face in a forward side in forward and backward directions of the vehicle). Angle of the image device 4 is adjusted to photograph a range including a road surface of the vehicle forward. The image device 4 photographs the vehicle forward, and outputs a video signal indicating the photographed video image of the vehicle forward to the vehicle position attitude calculation apparatus 1. When photographing the vehicle forward, the image device 4 outputs a video signal indicating the photographed video image of the vehicle forward to the vehicle position attitude calculation apparatus 1. The image device 4 may be, for example, a CCD (Charge Coupled Device) image sensor, a CMOS (Complementary Metal Oxide Semiconductor) image sensor, or the like. The image device 4 may be singular or plural.

A vehicle speed detection portion 5 detects a vehicle speed. The vehicle speed detection portion 5 detects a movement distance of the vehicle based on the detected vehicle speed. The vehicle speed detection portion 5 outputs a detection signal indicating the movement distance of the detected vehicle to the vehicle position attitude calculation apparatus 1. An inertial sensor 6 detects an azimuth variation amount of the vehicle, and outputs a detection signal indicating the detected azimuth variation amount of the vehicle to the vehicle position attitude calculation apparatus 1. The inertial sensor 6 may be an arbitrary combination of a gyro (yaw rate), a gyro (pitch), a gyro (roll), an acceleration sensor, a barometric pressure sensor, a geomagnetic sensor, or the like. A GNSS (Global Navigation Satellite System) portion 7 (corresponding to a position detection portion) receives information on trajectories of multiple navigation satellites, and calculates parameters. When the GNSS portion 7 detects an absolute position and an absolute velocity vector of the vehicle, the GNSS portion 7 outputs a detection signal indicating the absolute position and the absolute velocity vector of the detected vehicle to the vehicle position attitude calculation apparatus 1.

The lane marking recognition portion 2a receives the video signal from the image device 4, the detection signal from the vehicle speed detection portion 5, and the detection signal from the inertial sensor 6. Thereafter, the lane marking recognition portion 2a executes, in a predetermined procedure such as image process including edge detection, noise removal or the like, range limitation, bird's-eye view transformation, multiple frame images connection or the like, based on the video image of the vehicle forward photographed by the image device 4, the movement distance of the vehicle detected by the vehicle speed detection portion 5 and the azimuth variation amount of the vehicle detected by the inertial sensor 6. The lane marking recognition portion 2a recognizes the lane marking (for example, white lane) on the road surface.

Figure 2:
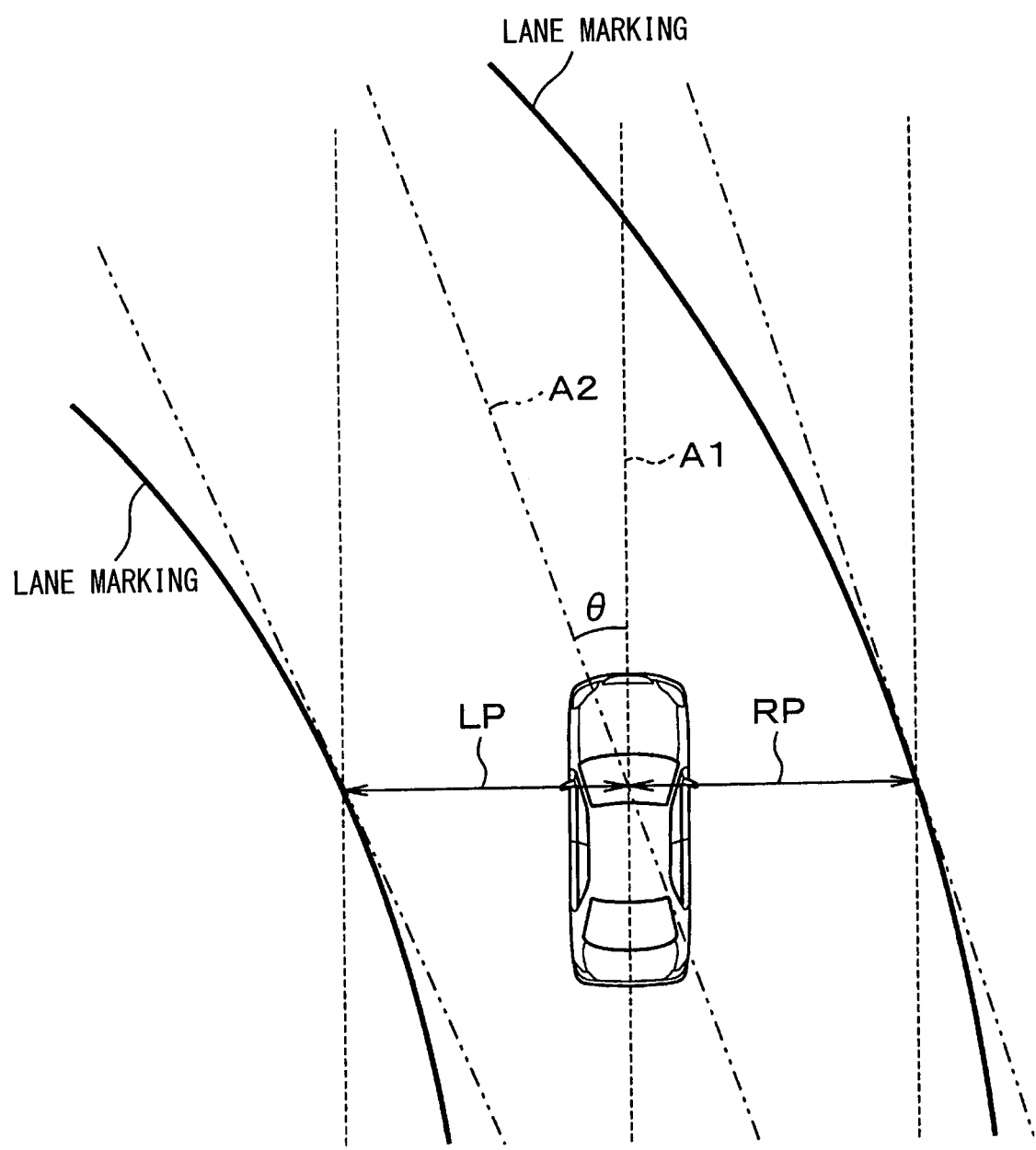
FIG. 2 is a view showing a lane marking shape, a relative lane marking lateral position, and a relative lane marking yaw angle.

After recognizing the lane marking on the road surface, the lane marking recognition portion 2a calculates a lane marking shape indicating a shape of the recognized lane marking (for example, corresponding to a curvature, a road structure shape, or the like). In addition, the lane marking recognition portion 2a calculates a relative lane marking lateral position indicating the lateral position to the lane marking and the relative lane marking yaw angle indicating a vehicle yaw angle (corresponding to a road structure yaw angle). As shown in FIG. 2, the relative lane marking lateral position indicates a relative position of the vehicle to the road surface. On the basis of the vehicle forward from a placed position of the image device 4, the lane marking lateral position is positioned in a distance (RP) to a lane marking in a right side of the vehicle. On the basis of the vehicle forward from the placed position of the image device 4, the lane marking lateral position is positioned in a distance (LP) to a lane marking in a left side of the vehicle. The relative lane marking yaw angle indicates the relative direction of the vehicle to the road surface. The relative lane marking yaw angle is an angle ($\theta$) between an axis (A1) in a front-and-rear direction of the vehicle and a reference axis (A2) on the road surface. The lane marking recognition portion 2a outputs the calculated lane marking shape to the storage portion 3 and a vehicle control ECU 8. The lane marking recognition portion 2a outputs the calculated lane marking lateral position and the calculated relative lane marking yaw angle to the storage portion 3 and the output switching portion 2d.

The lane marking recognition portion 2a outputs to a virtual lane marking recognition portion 2c and an output switching portion 2d, a non-detection determination signal indicating whether to be identifying occurrence of the non-detection caused by disruption, deterioration of the video signal from the image device 4, or the like. The lane marking recognition portion 2a outputs the non-detection determination signal by switching levels, for example. While not identifying the occurrence of the non-detection, the lane marking recognition portion 2a outputs the non-detection determination signal at a low level. While identifying the occurrence of the non-detection, the lane marking recognition portion 2a outputs the non-detection determination signal at a high level. That is, while identifying the occurrence of the non-detection, the lane marking recognition portion 2a switches the output of the non-detection determination signal from the low level to the high level. While identifying a solving of the non-detection, the lane marking recognition portion 2a switches the output of the non-detection determination signal from the high level to the low level.

The storage portion 3 includes a storage area having a predetermined capacity. When receiving the lane marking shape, the lane marking lateral position, and the relative lane marking yaw angle from the lane marking recognition portion 2a, the storage portion 3 stores the input lane marking shape, the input lane marking lateral position, and the input relative lane marking yaw angle in the predetermined storage area.

The autonomous navigation portion 2b receives the detection signal from the vehicle speed detection portion 5, a detection signal from the inertial sensor 6, and a detection signal from the GNSS portion 7. Thereafter, the autonomous navigation portion 2b performs an autonomous navigation calculation based on the movement distance of the vehicle detected by the vehicle speed detection portion 5, the azimuth variation amount of the vehicle detected by the inertial sensor 6, and the absolute speed and the absolute position of the vehicle detected by the GNSS portion 7. The autonomous navigation portion 2b calculates a relative trajectory. The autonomous navigation portion 2b outputs the calculated relative trajectory of the vehicle to the virtual lane marking recognition portion 2c. A configuration including a high resolution wheel speed pulse signal may be employed as the vehicle speed detection portion 5. A configuration including multiple devices with a small temperature drift and with a high time stability may be employed as the inertial sensor 6. Thereby, an accuracy of the relative trajectory of the vehicle is improved, the relative trajectory being calculated by the autonomous navigation portion 2b. According to the embodiment, the azimuth variation amount of the vehicle detected by the inertial sensor 6 is corrected based on the absolute speed vector and the absolute position of the vehicle detected by the GNSS portion 7. Thereby, the accuracy of the relative trajectory of the vehicle calculated by the autonomous navigation portion 2b is improved.

The virtual lane marking recognition portion 2c starts to calculate the virtual relative lane marking lateral position and the virtual relative lane marking yaw angle when the non-detection determination signal input from the marking lane recognition portion 2a is switched from the low level to the high level. That is, when the non-detection determination signal input from the lane marking recognition portion 2a is switched from the low level to the high level, the virtual lane marking recognition portion 2c calculates the virtual relative lane marking lateral position and the virtual relative lane marking yaw angle, based on the lane marking shape, the relative lane marking yaw angle, and the relative lane marking lateral position that are stored in the storage portion 3, and on the relative trajectory of the vehicle input from the autonomous navigation portion 2b. Specifically, based on the lane marking shape stored in the storage portion 3, the virtual lane marking recognition portion 2c sets to an initial position, the relative lane marking lateral position at a moment immediately before the non-detection occurs. The virtual lane marking recognition portion 2c sets to an initial azimuth, the relative lane marking yaw angle at a moment immediately before the non-detection occurs. Thereafter, the virtual lane marking recognition portion 2c superposes the relative trajectory input from the autonomous navigation portion 2b, and calculates the virtual relative lane marking lateral position and the virtual relative lane marking yaw angle, for each of arbitrary moments. The virtual lane marking recognition portion 2c outputs the calculated virtual relative lane marking lateral position and the calculated virtual relative lane marking yaw angle to the output switching portion 2d.

The virtual lane marking recognition portion 2c stops calculating the virtual relative lane marking lateral position and the virtual relative lane marking yaw angle when the non-detection determination signal input from the lane marking recognition portion 2a is switched from the high level to the low level. The virtual lane marking recognition portion 2c continues to calculate the virtual relative lane marking lateral position and the virtual relative lane marking yaw angle while the storage portion 3 holds the lane marking shape. However, while the storage portion 3 does not hold the lane marking shape even before the non-detection determination signal input from the lane marking recognition portion 2a is switched from the high level to the low level, the virtual lane marking recognition portion 2c stops calculating the virtual relative lane marking lateral position and the virtual relative lane marking yaw angle.

While the non-detection determination signal at the low level is input from the lane marking recognition portion 2a, the virtual lane marking recognition portion 2c outputs a first notification signal to the vehicle control ECU 8. That is, by outputting the first notification signal to the vehicle control ECU 8, the virtual lane marking recognition portion 2c notifies the vehicle control ECU 8 that the lane marking recognition portion 2a can continue to recognize the lane marking and the virtual relative lane marking lateral position, and the virtual relative lane marking yaw angle is not being calculated.

While the non-detection determination signal at the high level is input from the lane marking recognition portion 2a and also while the virtual relative lane marking lateral position and the virtual relative lane marking yaw angle are calculated, the virtual lane marking recognition portion 2c outputs a second notification signal to the vehicle control ECU 8. That is, by outputting the second notification signal to the vehicle control ECU 8, the virtual lane marking recognition portion 2c notifies the vehicle control ECU 8 that the lane marking recognition portion 2a cannot continue to recognize the lane marking and the storage part 3 holds also the lane marking shape, and the virtual relative lane marking lateral position and the virtual relative lane marking yaw angle are being calculated.

While the non-detection determination signal at the high level is input from the lane marking recognition portion 2a and the virtual relative lane marking lateral position and the virtual relative lane marking yaw angle are not calculated, the virtual lane marking recognition portion 2c outputs a third notification signal to the vehicle control ECU 8. That is, by outputting the third notification signal to the vehicle control ECU 8, the virtual lane marking recognition portion 2c notifies the vehicle control ECU 8 that the lane marking recognition portion 2a cannot continue to recognize the lane marking and also the storage portion 3 does not hold the lane marking shape, and the virtual relative lane marking lateral position and the virtual relative lane marking yaw angle are not being calculated.

With respect to the level of the non-detection determination signal input from the lane marking recognition portion 2a, the output switching portion 2d switches between a first output state and a second output state. In the first output state, the relative lane marking lateral position and the relative lane marking yaw angle, which are input from the lane marking recognition portion 2a, are the device output. In the second output state, the virtual relative lane marking lateral position and the virtual relative lane marking yaw angle, which are input from the virtual lane marking recognition portion 2c, are the device output. While the non-detection determination signal is input at the low level, the output switching portion 2d sets the first output state. The output switching portion 2d outputs to the vehicle control ECU 8, the relative lane marking lateral position and the relative lane marking yaw angle, which are input from the lane marking recognition portion 2a, as the device output. While the non-detection determination signal is input at the high level, the output switching portion 2d sets the second output state. The output switching portion 2d outputs to the vehicle control ECU 8, the virtual relative lane marking lateral position and the virtual relative lane marking yaw angle, which are input from the virtual lane marking recognition portion 2c, as the device output.

The vehicle control ECU 8 performs a vehicle control corresponding to the driving assistance application based on the relative lane marking lateral position and the relative lane marking yaw angle that are input from the vehicle position attitude calculation apparatus 1. The vehicle control ECU 8 outputs a brake control signal to a brake ECU 9, and controls the driving of the brake. The vehicle control ECU 8 outputs an accelerator control signal to an accelerator ECU 10, and controls actuation of the accelerator. The vehicle control ECU 8 outputs a steering control signal to a steering ECU 11, and controls a steering angle of a steering. The vehicle control ECU 8 outputs a HMI control signal to a HMI portion 12, and controls a notification operation by the HMI portion 12. The HMI portion 12 is, for example, a speaker, a head-up display, or the like. When the HMI control signal is input from the vehicle position attitude calculation apparatus 1, the HMI portion 12 outputs audio information or displays notification information.

Figure 3:
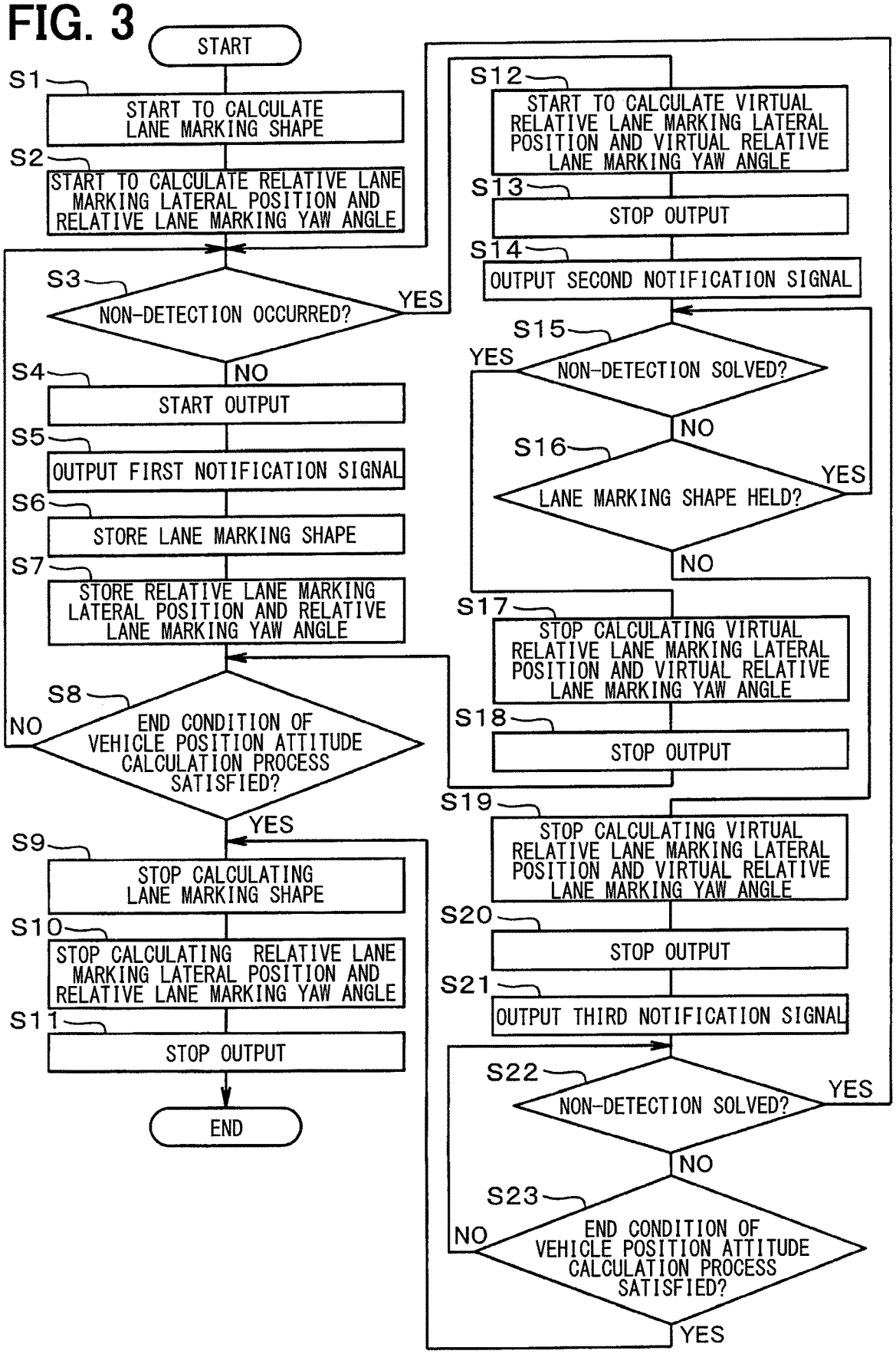
FIG. 3 is a flowchart.

One of the effects of the configuration is described with reference to FIG. 3 and FIG. 4. The control portion 2 performs a vehicle position attitude calculation process. The control portion 2 starts the vehicle position attitude calculation process when a start condition of the vehicle position attitude calculation process, such as switching of the ignition switch from OFF to ON, is satisfied. The control portion 2 may add to the start condition of the vehicle position attitude calculation process, for example, that the vehicle speed is equal to or higher than an arbitrary speed, that the driver performs a predetermined operation, or the like.

When the vehicle position attitude calculation process starts, the control portion 2 starts to recognize the lane marking on the road surface, starts to calculate the lane marking shape (S1, corresponding to a first calculation procedure), and starts to calculate the relative lane marking lateral position and the relative lane marking yaw angle (S2, corresponding to a second calculation procedure), based on the image signal input from the image device 4, the detection signal input from the vehicle speed detection portion 5 and the detection signal input from the inertial sensor 6.

The control portion 2 determines whether non-detection occurs due to disruption, deterioration or the like of the video signal from the image device 4 (S3). When determining that non-detection does not occur (S3: NO), the control portion 2 maintains the output switching portion 2d in the first output state, and starts to output the calculated relative lane marking lateral position and the calculated relative lane marking yaw angle to the vehicle control ECU 8 (S4, corresponding to a first output procedure). The control portion 2 outputs to the vehicle control ECU 8, the first notification signal indicating that the virtual relative lane marking lateral position and the virtual relative lane marking yaw angle are not being calculated (S5).

The control portion 2 stores the calculated lane marking in the storage portion 3 (S6, corresponding to a first storage procedure). The control portion 2 stores the calculated relative lane marking lateral position and the calculated relative lane marking yaw angle in the storage portion 3 (S7, corresponding to a second storage procedure). The control portion 2 determines whether an end condition of the vehicle position attitude calculation process is satisfied (S8). When determining that the end condition of the vehicle position attitude calculation process is not satisfied (S8: NO). The control portion 2 returns to step 3. The control portion 2 repeats step 3 and process after step 3.

By contrast, when determining the end condition of the vehicle position attitude calculation process, for example, such as switching the ignition switch from ON to OFF is satisfied (S8: YES), the control portion 2 stops calculating the lane marking shape (S9). The control portion 2 stops calculating the relative lane marking lateral position and the relative lane marking yaw angle (S10). The control portion 2 stops outputting the relative lane marking lateral position and the relative lane marking yaw angle to the vehicle control ECU 8 (S11). The vehicle position attitude calculation process ends. The control portion 2 may add to the end condition of the vehicle position attitude calculation process, for example, a case where the vehicle speed is less than the arbitrary speed, a case where the driver performs the predetermined operation, or the like.

When determining that the non-detection occurs (S3: YES), the control portion 2 switches the output switching portion 2d from the first output state to the second output state. The control portion 2 starts to calculate the virtual relative lane marking lateral position and the virtual relative lane marking yaw angle (S12, corresponding to a third calculation procedure). The control portion 2 outputs to the vehicle control ECU 8, the calculated virtual relative lane marking lateral position and the calculated virtual relative lane marking yaw angle (S13, corresponding to a second output procedure). The control portion 2 outputs to the vehicle control ECU 8, the second notification signal indicating that the virtual relative lane marking lateral position and the virtual relative lane marking yaw angle are being calculated (S14).

The control portion 2 determines whether the non-detection is solved (S15), and determines whether the storage portion 3 holds the lane marking shape (S16). When determining that the non-detection is solved before the storage portion 3 does not hold the lane marking shape (S15: YES), the control portion 2 switches the output switching portion 2d from the second output state to the first output state. The control portion 2 stops calculating the virtual relative lane marking lateral position and the virtual relative lane marking yaw angle (S17). The control portion 2 stops outputting to the vehicle control ECU 8, the virtual relative lane marking lateral position and the virtual relative lane marking yaw angle (S18). The control portion 2 determines whether the end condition of the vehicle position attitude calculation process is satisfied (S8). When determining that the end condition of the vehicle position attitude calculation process is not satisfied (S8: NO), the control portion 2 returns to step 3. The control portion 2 repeats step 3 and process after step 3. That is, the control portion 2 returns to a state before the non-detection occurs, and restarts to output to the vehicle control ECU 8, the calculated relative lane marking lateral position and the calculated relative lane marking yaw angle (S4). The control portion 2 outputs the first notification signal to the vehicle control ECU 8 (S5), and stores the calculated lane marking shape in the storage portion 3 (S6). The control portion 2 stores the calculated relative lane marking lateral position and the calculated relative lane marking yaw angle in the storage portion 3 (S7).

By contrast, when determining that the storage portion 3 does not hold the lane marking shape before the non-detection is solved (S16: NO), the control portion 2 stops calculating the virtual relative lane marking lateral position and the virtual relative lane marking yaw angle (S19). The control portion 2 stops outputting to the vehicle control ECU 8, the virtual relative lane marking lateral position and the virtual relative lane marking yaw angle (S20). The control portion 2 outputs to the vehicle control ECU 8, the third notification signal indicating that the storage part 3 does not hold the lane marking shape, and the virtual relative lane marking lateral position and the virtual relative lane marking yaw angle are not being calculated (S21).

The control portion 2 determines whether the non-detection is solved (S22), and determines whether the end condition of the vehicle position attitude calculation process is satisfied (S23). When determining that the non-detection is solved before the end condition of the vehicle position attitude calculation process is satisfied (S22: YES), the control portion 2 switches the output switching portion 2d from the second output state to the first output state. The control portion 2 returns to step S3, and repeats step S3 and process after step 3. That is, in the case too, the control portion 2 returns to the state before the non-detection occurs, and restarts to output to the vehicle control ECU 8, the calculated relative lane marking lateral position and the calculated relative lane marking yaw angle (S4). The control portion 2 outputs the first notification signal to the vehicle control ECU 8 (S5), and stores the calculated lane marking shape in the storage portion 3 (S6). The control portion 2 stores the calculated relative lane marking lateral position and the calculated relative lane marking yaw angle in the storage portion 3 (S7).

When determining that the end condition of the vehicle position attitude calculation process is satisfied before the non-detection is solved (S23: YES), the control portion 2 stops calculating the lane marking shape (S9). The control portion 2 stops calculating the relative lane marking lateral position and the relative lane marking yaw angle (S10). The control portion 2 stops outputting the relative lane marking lateral position and the relative lane marking yaw angle to the vehicle control ECU 8 (S11). The vehicle position attitude calculation process ends.

Figure 4:
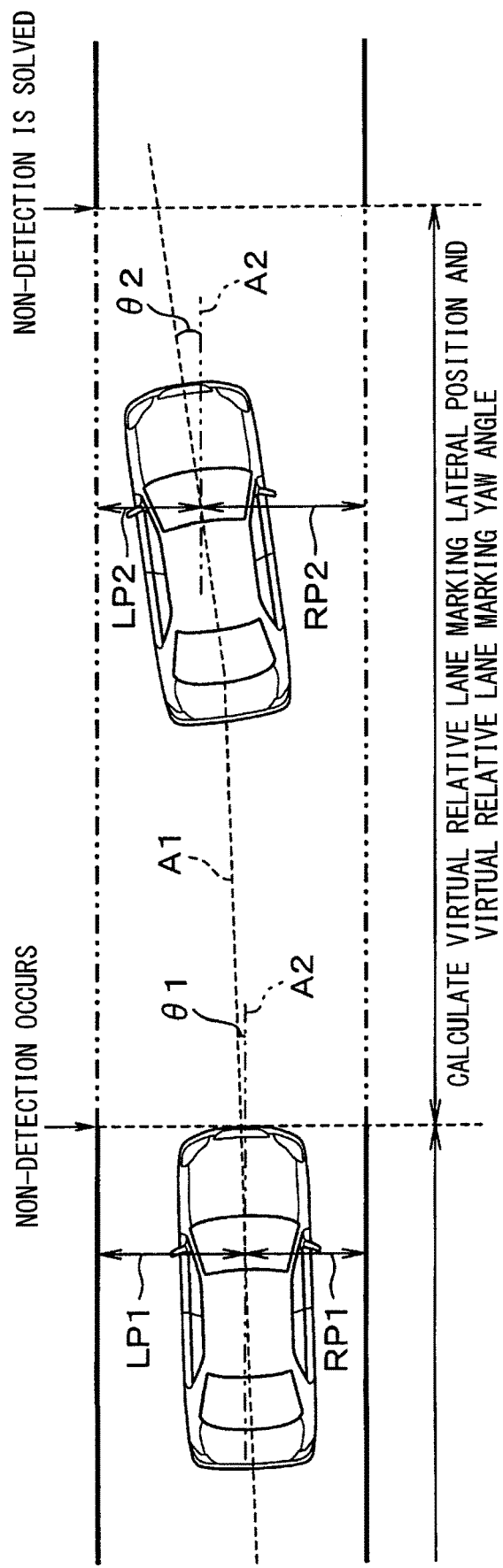
FIG. 4 is a view showing one aspect calculating a virtual relative lane marking lateral position and a virtual relative lane marking yaw angle.

As shown in FIG. 4, by the process described above, the control portion 2 starts to calculate the virtual relative lane marking lateral position and the virtual relative lane marking yaw angle even while the non-detection occurs. Thereby, it may be possible to continue to calculate the virtual relative lane marking lateral position and the virtual relative lane marking yaw angle. That is, even while the non-detection occurs after calculating the relative lane marking lateral position (RP1, LP1) and calculating the relative lane marking yaw angle (1), the control portion 2 can calculate the virtual relative lane marking lateral position (RP2, LP2) and calculate the relative lane marking yaw angle (2). The control portion 2 continues to output to the vehicle control ECU 8, the relative lane marking lateral position and the relative lane marking yaw angle. The control portion 2 may be possible to continue the driving assistance by the vehicle control ECU 8. That is, the control portion 2 may be possible to continue the vehicle control such as driving assistance by the vehicle control ECU 8 without disruption. As one example of concrete figures, in a case where the lane marking shape of the vehicle forward for 75 meters can be stored by function of the image device 4 and the vehicle travels at 90 km/h, it may be possible to continue to calculate the relative lane marking lateral position and the relative lane marking yaw angle even when the non-detection continues for about 3 seconds. Though an example of a case where the vehicle travels on a straight road is shown in FIG. 4, a case where the vehicle travels on a curve road is similar to the example.

The control portion 2 outputs the notification signal to the vehicle control ECU 8. Thereby, it may be possible to notify the vehicle control ECU 8 of whether the non-detection occurs while the relative lane marking lateral position and the relative lane marking yaw angle are output to the vehicle control ECU 8. It may be possible to notify the vehicle control ECU 8 of reliability of whether the relative lane marking lateral position and the relative lane marking yaw angle are a virtually calculated value. Thereby, the vehicle control ECU 8 may be possible to determine the reliability of the relative lane marking lateral position and the relative lane marking yaw angle that are input from the vehicle position attitude calculation apparatus 1. It may be possible to change content of the driving assistance with respect to the determined reliability. It may be possible to notify the driver of the reliability.

According to the embodiment described above, the following effects can be obtained. In the vehicle position attitude calculation apparatus 1, while the lane marking on the road surface of the vehicle forward is recognizable, the storage portion 3 stores the lane marking shape, the relative lane marking lateral position and the relative lane marking yaw angle. While the lane marking is unrecognizable, the virtual relative lane marking lateral position and the virtual relative lane marking yaw angle are calculated as the device output, based on the lane marking shape, the relative lane marking lateral position and the relative lane marking yaw angle that are stored in the storage portion 3. The virtual relative lane marking lateral position and the virtual relative lane marking yaw angle are output to the vehicle control ECU 8. Thereby, it may be possible to appropriately calculate and output the position attitude of the vehicle even while the lane marking is unrecognizable. Then, the lane marking is unrecognized based on the road structure database measured in advance, and the lane marking is recognized based on the video image of the road surface of the vehicle forward photographed by the image device 4. Therefore, it may be possible to ensure the reliability and appropriately apply to the driving assistance application requiring the reliability. That is, in a case of the configuration employing the road structure data base, position or length of the lane marking may be changed by, for example, a redrawing of a paint or the like from a time of road maintenance. The reliability may not be ensured. However, according to the configuration recognizing the lane marking based on the video image of the road surface of the vehicle forward described in the embodiment, it may be possible to ensure the reliability without losing the reliability. Preparation of a map is unnecessary corresponding to the road structure database since the road structure database is not referred. The data communication to acquire the road structure database is unnecessary. It may be possible to easily perform a function safe address.

In the vehicle position attitude calculation apparatus 1, the relative trajectory is calculated based on the movement distance of the vehicle, the azimuth variation amount of the vehicle, the absolute position of the vehicle, the absolute speed vector of the vehicle. Thereby, it may be possible to calculate the relative trajectory of the vehicle and the virtual relative lane marking lateral position and the virtual relative lane marking yaw angle with high accuracy by correcting the azimuth variation amount of the vehicle based on the absolute position and the absolute speed vector.

In the vehicle position attitude calculation apparatus 1, the notification signal is output to the vehicle control ECU 8. Thereby, it may be possible to distinguish among a case where the lane marking continues to be recognizable, and the virtual relative lane marking lateral position and the virtual relative lane marking yaw angle are not being calculated, a case where the lane marking continues to be recognizable and also the storage part 3 holds the lane marking shape and, the virtual relative lane marking lateral position and the virtual relative lane marking yaw angle are being calculated, and a case where the lane marking continues to be unrecognizable and also the storage portion 3 does not hold the lane marking shape, and the virtual relative lane marking lateral position and the virtual relative lane marking yaw angle are not being calculated. It may be possible to notify the vehicle control ECU 8 of the distinguished case.

The vehicle position attitude calculation apparatus 1 recognizes the lane marking based on the video image of the road surface the vehicle forward photographed by the image device 4. Thereby, it may be possible to recognize the lane marking by employing a method of a video analysis.

Although the present disclosure has been made in accordance with the embodiments, it is understood that the present disclosure is not limited to such embodiments and structures. The present disclosure may cover various modification examples and equivalent arrangements. Furthermore, various combinations and formations, and other combinations and formations including one, more than one or less than one element may be included in the scope and the spirit of the present disclosure.

Though the example of the configuration that the autonomous navigation portion 2b is placed inside the vehicle position attitude calculation apparatus 1 is shown, the autonomous navigation portion 2b may be placed outside the vehicle position attitude calculation apparatus 1. That is, the virtual relative lane marking lateral position and the virtual relative lane marking yaw angle may be calculated based on the relative trajectory of the vehicle calculated outside the vehicle position attitude calculation apparatus 1. Though the example of the configuration that lane marking recognition portion 2a is placed inside the vehicle position attitude calculation apparatus 1 is shown, the lane marking recognition portion 2a may be placed outside the vehicle position attitude calculation apparatus 1, and the lane marking recognition portion 2a may be placed inside the image device 4, for example.

Though the example of the configuration that the lane marking is recognized based on the video image of the road surface of the vehicle forward photographed by the image device 4 is shown, the lane marking may be recognized by employing a millimeter wave radar or LiDAR (Light Detection And Ranging) instead of the image device 4.

Though the example of the configuration that the lane marking is recognized as the road structure is shown, the limits enabling to travel such as banks, walls, curbstones, guard rails, forward obstacles, or the like may be recognized as the road structure. The example of the configuration that the virtual lane marking recognition portion 2c starts to calculate the virtual relative lane marking lateral position and the virtual relative lane marking yaw angle at the switching of the non-detection determination signal from the low level to the high level is shown, the non-detection determination signal being input from the lane marking recognition portion 2a. However, the virtual relative lane marking lateral position and the virtual relative lane marking yaw angle may be always calculated. The calculated virtual relative lane marking lateral position and the calculated virtual relative lane marking yaw angle may be always output to the output switching portion 2d. In the case, the relative lane marking lateral position at an arbitrary moment in a predetermined cycle may be set to the initial position. The relative lane marking yaw angle may be set to the initial azimuth at the arbitrary moment in the predetermined cycle. The virtual lane marking recognition portion 2c may set to the initial azimuth, the relative lane marking yaw angle at a moment immediately before the non-detection occurs. Thereafter, the virtual lane marking recognition portion 2c may superpose the relative trajectory input from the autonomous navigation portion 2b, and may calculate the virtual relative lane marking lateral position and the virtual relative lane marking yaw angle, for each of the arbitrary moments in the predetermined cycle.

The invention claimed is:

1. A vehicle position attitude calculation apparatus, comprising:
   a central processing unit (CPU) that corresponds to
      a road structure recognition portion that is configured to
         acquire information including a road structure of a vehicle forward to recognize the road structure,
         calculate a road structure shape showing a shape of a road,
         calculate a relative road structure lateral position showing a vehicle lateral position to the road structure, and
         calculate a relative road structure yaw angle showing a vehicle yaw angle to the road structure; and
   a memory that corresponds to a storage portion that is configured to store the road structure shape, the relative road structure lateral position, and the relative road structure yaw angle, which are calculated by the road structure recognition portion, wherein the CPU further corresponds to:
   an autonomous navigation portion that is configured to calculate a relative trajectory of the vehicle;
   a virtual road structure recognition portion that is configured to calculate a virtual relative road structure lateral position and a virtual relative road structure yaw angle, based on the road structure shape, the relative road structure lateral position, the relative road structure yaw angle, which are stored in the storage portion, and the relative trajectory of the vehicle, which is calculated by the autonomous navigation portion; and
   an output switching portion that is configured to output as a device output, the relative road structure lateral position and the relative road structure yaw angle, which are calculated by the road structure recognition portion, to a subsequent stage, while the road structure recognition portion is able to recognize the road structure, and output as the device output, the virtual relative road structure lateral position and the virtual relative road structure yaw angle, which are calculated by the virtual road structure recognition portion, to the subsequent stage, while the road structure recognition portion is unable to recognize the road structure.

2. The vehicle position attitude calculation apparatus according to claim 1, wherein:

the virtual road recognition portion starts to calculate the virtual relative road structure lateral position and the virtual relative road structure yaw angle in response to a state where the road structure recognition portion is able to recognize the road structure is switched to a state where the road structure recognition portion is unable to recognize the road structure.

3. The vehicle position attitude calculation apparatus according to claim 1, wherein:

the autonomous navigation portion is further configured to calculate the relative trajectory of the vehicle, based on a movement distance of the vehicle detected by a vehicle speed detection portion, an azimuth variation amount of the vehicle detected by an inertial sensor, an absolute speed of the vehicle detected by a position detection portion, and an absolute position of the vehicle detected by the position detection portion.

4. The vehicle position attitude calculation apparatus according to claim 1, wherein:

the virtual road structure recognition portion is further configured to output to a subsequent stage, a notification signal that distinguishes among a case where the virtual relative road structure lateral position and the virtual relative road structure yaw angle are not being calculated since the road structure recognition portion is able to recognize the road structure, a case where the virtual relative road structure lateral position and the virtual relative road structure yaw angle are being calculated since the road structure recognition portion is unable to recognize the road structure and the storage portion holds the road structure shape, and a case where the virtual relative road structure lateral position and the virtual relative road structure yaw angle are not being calculated since the road structure recognition portion is unable to recognize the road structure and the storage portion does not hold the road structure shape.

5. The vehicle position attitude calculation apparatus according to claim 1, wherein:

the road structure recognition portion is further configured to acquire information including a lane of the vehicle forward, and recognize a lane marking, calculate a lane marking shape showing a shape of the lane marking, and calculate a relative lane marking lateral position showing a lateral position to the lane marking and a relative lane marking yaw angle showing a vehicle yaw angle to the lane marking;

the storage portion is further configured to store the lane marking shape, the relative lane marking lateral position, and the relative lane marking yaw angle, which are calculated by the road structure recognition portion; and the virtual road structure recognition portion is further configured to calculate a virtual relative lane marking lateral position and a virtual relative lane marking yaw angle, based on the lane marking shape, the relative lane marking lateral position, the relative lane marking yaw angle, which are stored in the storage portion, and the relative trajectory of the vehicle calculated by the autonomous navigation portion.

6. The vehicle position attitude calculation apparatus according to claim 5, wherein:

the road structure recognition portion is further configured to acquire a video image of the road surface of the vehicle forward photographed by an image device as the information including the road structure of the vehicle forward.

7. The vehicle position attitude calculation apparatus according to claim 5, wherein the relative road structure lateral position indicates a lateral position with respect to the lane marking, and is calculated based on a distance from the vehicle to a lane marking on a right side of the vehicle and a distance from the vehicle to a lane marking on a left side of the vehicle on a basis of the vehicle forward, and the virtual road structure lateral position indicates the vehicle lateral portion.

8. The vehicle position attitude calculation apparatus according to claim 1 wherein the road structure recognition portion is further configured to recognize the road structure without using a road structure database.

9. A vehicle position attitude calculation program product stored in a non-transitory computer readable storage medium, the vehicle position attitude calculation program product causing a control portion of a vehicle position attitude calculation apparatus to perform:

a first calculation procedure that calculates a road structure shape showing a shape of a road, a second calculation procedure that calculates a relative road structure lateral position showing a vehicle lateral position to the road structure and a relative road structure yaw angle showing a vehicle yaw angle to the road structure;

a first storage procedure that stores the road structure shape calculated by the first calculation procedure;

a second storage procedure that stores the relative road structure lateral position and the relative road structure yaw angle calculated by the second calculation procedure;

a third calculation procedure that calculates a virtual relative road structure lateral position and a virtual relative road structure yaw angle, based on the road structure shape stored by the first storage procedure, the relative road structure lateral position and the relative road structure yaw angle stored by the second storage procedure, and a relative trajectory of the vehicle;

a first output procedure that outputs to a subsequent stage, the relative road structure lateral position and the relative road structure yaw angle calculated by the second calculation procedure as a device output, while the road structure is recognizable; and a second output procedure that outputs to a subsequent stage, the virtual relative road structure lateral position and the virtual relative road structure yaw angle calculated by the third calculation procedure as the device output, while the road structure is unrecognizable.

* * * * *